United States Patent
Sakai et al.

(10) Patent No.: US 7,357,912 B2
(45) Date of Patent: Apr. 15, 2008

(54) METHOD OF CATALYTIC DECOMPOSITION OF WATER

(75) Inventors: Masanori Sakai, Hitachiota (JP); Kazumi Fujii, Hitachi (JP); Kenji Araki, Mito (JP)

(73) Assignee: Hitachi, Ltd., Tokyo (JP)

( * ) Notice: Subject to any disclaimer, the term of this patent is extended or adjusted under 35 U.S.C. 154(b) by 201 days.

(21) Appl. No.: 11/206,967

(22) Filed: Aug. 19, 2005

(65) Prior Publication Data

US 2006/0113197 A1 Jun. 1, 2006

(30) Foreign Application Priority Data

Nov. 29, 2004 (JP) .............................. 2004-343249

(51) Int. Cl.
*C01B 3/04* (2006.01)
*B01J 21/06* (2006.01)

(52) U.S. Cl. ................. 423/657; 423/579; 502/240; 502/243; 502/250; 502/251

(58) Field of Classification Search ............... 502/240, 502/243, 250, 251; 423/648.1, 657, 658, 423/579

See application file for complete search history.

(56) References Cited

U.S. PATENT DOCUMENTS

| | | | | |
|---|---|---|---|---|
| 3,915,896 A | * | 10/1975 | Oliver | ........................ 502/250 |
| 3,939,104 A | * | 2/1976 | Campbell et al. | ............ 502/245 |
| 3,944,482 A | * | 3/1976 | Mitchell et al. | ........ 208/120.01 |
| 3,963,830 A | * | 6/1976 | Kasai et al. | ................. 423/579 |
| 4,278,650 A | * | 7/1981 | Dorrance | ..................... 423/579 |
| 4,496,662 A | * | 1/1985 | Chu | ........................... 502/183 |
| 4,556,749 A | * | 12/1985 | Hazbun | ...................... 585/330 |
| 4,613,724 A | * | 9/1986 | Debras et al. | .............. 585/824 |
| 6,037,299 A | * | 3/2000 | Senn et al. | .................. 502/202 |
| 6,468,499 B1 | * | 10/2002 | Balachandran et al. | ..... 423/657 |
| 6,582,676 B2 | * | 6/2003 | Chaklader | ................ 423/648.1 |

FOREIGN PATENT DOCUMENTS

| | | |
|---|---|---|
| JP | 10-263397 | 10/1998 |
| JP | 11-171501 | 6/1999 |
| WO | WO 2004/020330 A1 | 3/2004 |

* cited by examiner

*Primary Examiner*—Wayne A. Langel
(74) *Attorney, Agent, or Firm*—Antonelli, Terry, Stout & Kraus, LLP.

(57) ABSTRACT

A method of catalytically decomposing water, which comprises contacting water with a composite catalyst comprising a solid acid catalyst and a solid base catalyst at an elevated temperature, wherein the composite catalyst contains the solid acid catalyst in an amount of 36 to 65% by weight and the balance being the solid base catalyst, and wherein the temperature is higher than a temperature at which pH values of the ($H_2O/O_2$ redox) potential and ($H_2O/H_2$ redox) potential are equal to each other, the redox potentials being given by a water potential—pH value diagram.

8 Claims, 7 Drawing Sheets

FIG. 4
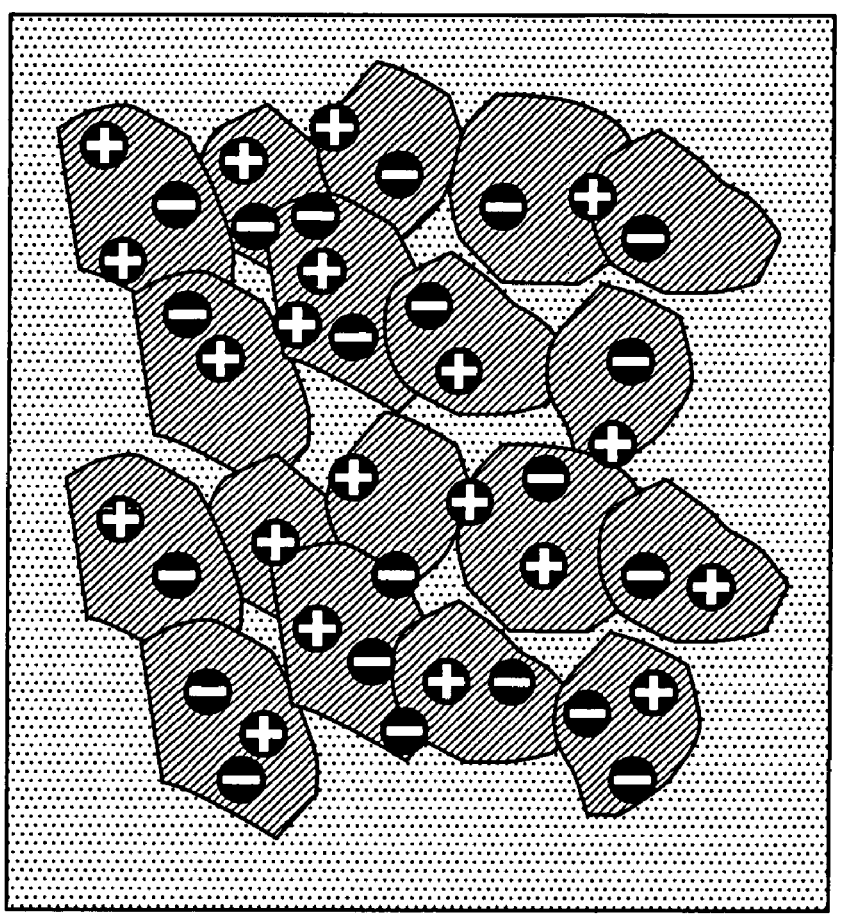
 POSITIVE ELECTRODE (ACID POINT)
 NEGATIVE ELECTRODE (BASE POINT)
 CERAMICS
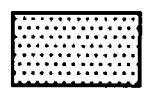 ADSORBED WATER

METHOD OF CATALYTIC DECOMPOSITION OF WATER

CLAIM OF PRIORITY

This application claims priority from Japanese application serial No. 2004-343249, filed on Nov. 29, 2004, the content of which is hereby incorporated by reference into this application.

FIELD OF THE INVENTION

The present invention relates to a method, an apparatus and a catalyst for catalytically decomposing water at low temperatures to produce hydrogen and oxygen.

RELATED ART

Nowadays a development of clean energy is urged from the view points of exhaustion of fossil fuels and preservation of the global environment. Utilization of hydrogen energy is one of typical examples of clean energy among the resources; however, hydrogen hardly exists by itself on the earth. Accordingly, a technology for supply hydrogen is the key for development of hydrogen energy. At present, many investigations of hydrogen production have been made; among them, a technology for producing hydrogen from water that is almost unexhaustible on the earth is particularly important. Electrolysis, steam reforming using fossil fuel, light-energy utilization using semiconductor photoelectron-chemical reaction, chemical reaction cycle using exhaust gas from high temperature furnaces, etc have been attempted.

In patent document No. 1 (WO 2004/020330), there is disclosed a catalytic decomposition of water at 130° C. in the presence of a catalyst carrying an alkali metal oxide and an alkaline earth metal oxide and a water electrolysis method using the catalyst.

In patent document Nos. 2, 3 (Japanese patent laid-open No. 10-263397 and Japanese patent laid-open No. 11-171501), there is disclosed a water electrolysis method using a natural zeolite at high temperature.

In general, a conversion temperature at which a reaction free energy for thermally decomposing water into hydrogen and oxygen changes a positive value to a negative value must exceed at several thousands degrees Celsius. Accordingly, there is no solution to produce hydrogen by a pure thermal decomposition of water.

The present inventors have discovered that if the reaction free energy change from the positive value to the negative value takes place at a temperature much lower than several thousands degrees Celsius, hydrogen may be produced from water.

The thermal decomposition equilibrium of water is expressed as follows.

$$H_2O \leftarrow \rightarrow H_2 + \tfrac{1}{2} O_2 \qquad (1)$$

In the equilibrium equation, a temperature condition under which the Gibbs free energy change $\Delta G$ changes into negative is as high as about 4000 degrees Celsius. Therefore, a direct thermal decomposition of water to produce hydrogen is not practical. The temperature condition where $\Delta G$ becomes negative is one under which the reaction equilibrium is the hydrogen generation reaction where hydrogen is produced from water as an initial reaction species. This equilibrium is considered as a necessary reaction condition by water decomposition for continuously supplying hydrogen.

Since the reaction proceeds backward if $\Delta G$ is positive, efficiency of decomposition reaction is bad and the reaction is unstable; thus the industrial production process will not be formulated. Accordingly, a technology that makes the Gibbs free energy $\Delta G$ becomes negative at several hundreds degrees Celsius is necessary for a clean energy technology using hydrogen. The above mentioned patent documents do not disclose the formation of micro cells comprising a catalyst of a solid acid catalyst and a solid base catalyst.

SUMMARY OF THE INVENTION

It is an object of the present invention to provide a method of thermal decomposition at relatively low temperatures to produce hydrogen and oxygen and an apparatus and a composite catalyst for practicing the method.

The present invention is featured by a water decomposition method wherein heated water is in contact with a composite catalyst, which comprises a mixture of a solid acid catalyst and a solid base catalyst. In a typical embodiment, the composite catalyst comprises 35 to 65% by weight of the solid acid catalyst and the solid base catalyst being balance. Preferably, the solid acid catalyst and the solid base catalyst in the composite catalyst have such a pH difference that a (water/oxygen redox) potential is substantially equal to a (water/hydrogen redox) potential, the potentials being given by the water potential-pH diagram at a given temperature. Water of a temperature higher than the given temperature such that the temperature exceeds the pH difference is contacted with the composite catalyst.

BRIEF DESCRIPTION OF THE DRAWINGS

FIG. 4 shows a diagrammatic view of micro-cells constituted by the solid acid catalyst and the solid base catalyst.

DETAILED DESCRIPTION OF THE PREFERRED EMBODIMENTS

Figure 1:
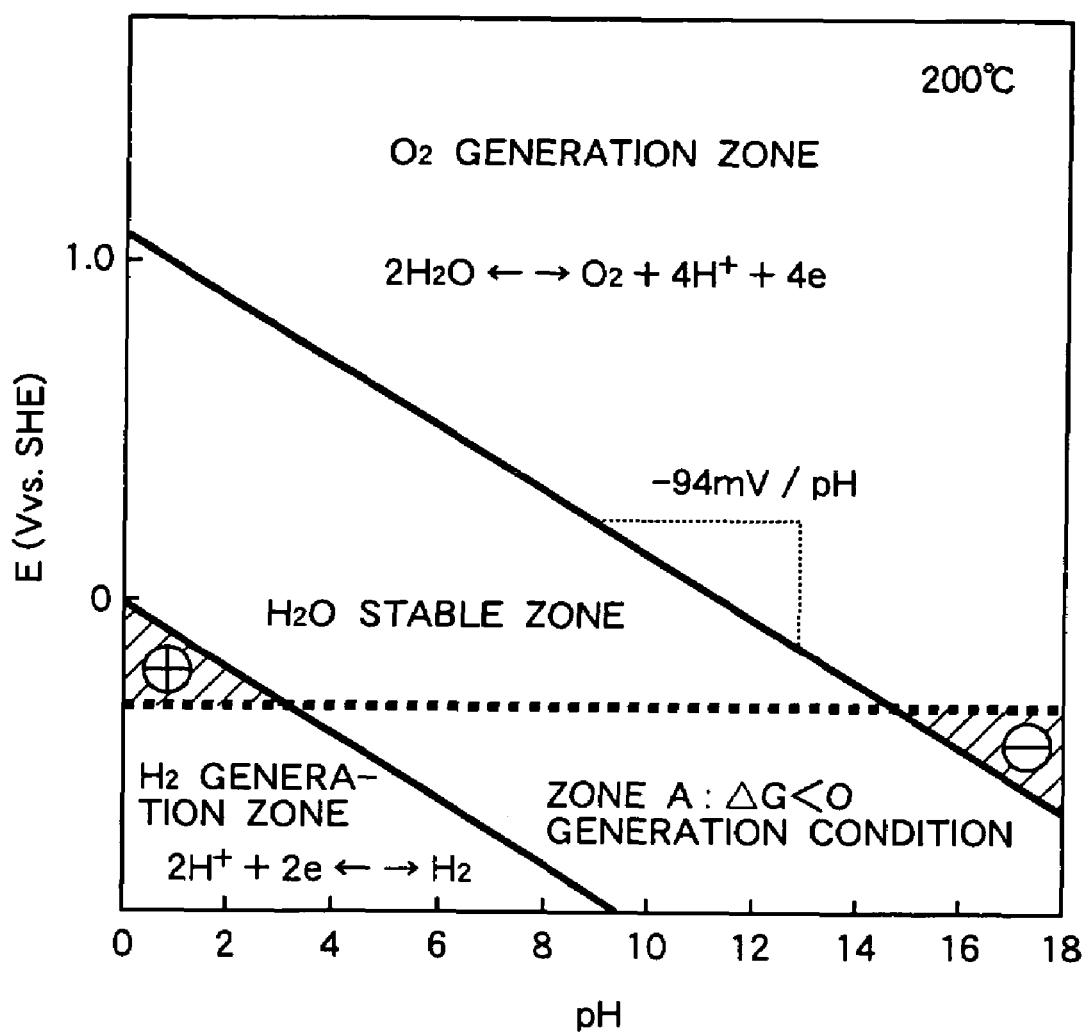
FIG. 1 is a graph showing relationship between water potential and pH at 200° C.

One of the embodiments of the present invention provides a method of catalytically decomposing water in a reaction vessel wherein a composite catalyst comprising a solid acid catalyst and a solid base catalyst is divided into several segments each being separated by means of ion-permeable membranes. The method comprises contacting water or steam with the composite catalyst at a temperature of 130° C. or higher, while applying a potential between the electrodes contacted with the segments of the catalysts.

Preferable solid acid catalysts and the solid base catalysts are particles having 1 to 50 µm. The main component of the solid acid catalysts is silicon acids, and the main component of the solid base catalysts is at least one of alkali metal compounds and alkaline earth metal compounds. Preferable silicon oxides are alumino-silicates. The solid base catalyst contains at least one oxide of K, Mg, and Ca. The temperature of water is 130° C. or higher.

The present invention provides a water decomposition apparatus comprising a reactor filled with a composite catalyst comprising a solid acid catalyst and a solid base catalyst being balance having a particle size of 1 to 50 µm and a means for supply water to the reactor. The composite catalyst comprises 35 to 65% by weight of the solid acid catalyst and the solid base catalyst. The composite catalyst has a pH difference, wherein a ($H_2O/O_2$ redox) potential is equal to a ($H_2O/H_2$ redox) potential at a given temperature, the potentials being given by the water potential—pH diagram at a given temperature. The temperature for water decomposition at which water is contacted with the catalyst should be such that the temperature exceeds the pH difference.

The present invention further provides a water decomposition apparatus comprising a reactor in which the composite catalyst comprising the solid acid catalyst and the solid base catalyst being divided into segments each being separated by one or more of ion permeable membranes, a positive electrode disposed at one face of the segment and a negative electrode disposed at the other face of the segment.

The apparatus may be provided with a heater for heating water; the water may be heated separately. The heated water may be cooled with a cooler after the reactor. The water that flows out from the reactor may be recycled to the reactor without being cooled. The apparatus may be provided with a separator for separating hydrogen from oxygen.

The present invention also provides a composite catalyst for water decomposition, which comprises a solid acid catalyst and a solid base catalyst in an amount of 35 to 65% by weight.

The present invention spontaneously provides a method of decomposing water wherein water or steam is contacted with a composite catalyst comprising a solid acid catalyst and a solid base catalyst at a temperature where the Gibbs free energy change ΔG is negative.

The water decomposition reaction proceeds from the left side to the right side of the equation (1) under such a condition that the ΔG is negative at a temperature of several hundreds when water is contacted with the composite catalyst.

When the solid acid catalyst and the solid base catalyst contact, micro cells comprising certain pH values at the positions of the respective micro-cells are formed at the contact points of the solid acid catalyst and the solid base catalyst, where protons $H^+$ accept electrons to form hydrogen in accordance with the equation (3). When the potential of the cathode reaction is maintained at a potential higher than the anode reaction potential of the equation (4) where $OH^-$ ions release electrons. The driving force of widening the pH difference is the potential difference between the solid acid catalyst and the solid base catalyst. When the temperature of water to be decomposed is increased whereby the Gibbs energy change becomes negative, the decomposition of water takes place at several hundreds.

Water is in the dissociation equilibrium state represented by the equation (2). The product of protons $H^+$ and hydroxy ions $OH^-$ is $[H^+][OH^-]=10^{-14}$ $(mol/L)^2$. Accordingly, a pH value $-\log[H^+]$ of neutral water is 7.0.

Protons and hydroxyl ions have redox equilibriums with hydrogen as shown in the equation (2) and oxygen as shown in the equation (3), respectively. If (2)+(3)+(4) are summed, the overall reaction equation (1) is obtained.

$$H_2O \leftarrow\rightarrow H^+ + OH^- \quad (2)$$

$$2H^+ + 2e \leftarrow\rightarrow H_2 \quad (3)$$

$$OH^- \leftarrow\rightarrow \tfrac{1}{2}O_2 + H^+ + 2e \quad (4)$$

The redox potential of (3) should be higher than the redox potential of (4) so as to make the reaction (1) proceed spontaneously in the right hand direction. That is, the potential for receiving electrons at (3) should be higher than the potential for releasing electrons at (4). Electrons having negative charge or in the lower energy level move spontaneously towards the direction where the potential is high, do not move in the opposite direction. When the micro cells are formed, the reactions proceed spontaneously as in the discharge reaction in the cells to attain the ΔG<0. The relationship is understood from the equation (5) below.

$$\Delta G = -nF\Delta E \quad (5)$$

In the above, n is the number of reaction electrons, F is Faraday constant and ΔE is a single polar potential difference between the cathode reaction (electron acceptor) and anode reaction (electron donor). Since ΔE is positive, ΔG will not be negative unless the potential of the cathode reaction is higher than the potential of the anode.

In the process of water decomposition, the cathode reaction is represented by (3) and the anode reaction is represented by (4). When the pH values at 25° C., the potential of (3) is lower than the potential of (4) by 1.23 V. Therefore, the ΔG is a large positive value at 25° C.

Single electrode potentials at the cathode reaction and the anode reaction are determined by Nernst equation (6).

$$E = E° + (2.303\ RT/nF)\log(\text{activity of oxidized species})/(\text{activity of reduced species}) \quad (6)$$

In the above, R is the gas constant, E° is the standard single electrode potential when the activity of oxidized species and the activity of reduced species is 1.

According to the equation (6), the pH dependency of the equations (3) and (4) at 25° C. is E/pH=–60 mV. In the electrochemical potential, the standard hydrogen electrode (SHE) potential of the hydrogen electrode reaction represented by the equation (3) is defined as zero V. At 25° C., the standard electrode potential is 1.23 V vs. SHE.

Accordingly, the ΔpH difference to attain the same single electrode potentials for the equations (3) and (4) is calculated by (1.23/0.06); ΔpH is 20.5. At 200° C., since the coefficient of the logarithmic term (2.303 RT/nF) contains temperature term T, the absolute values of the pH dependency of the equations (3) and (4) of the single electrode potential becomes large, i.e. E/pH=–94 mV. The difference between the standard electrode potential of (3) and of (4) becomes smaller than that at 25° C.; under the pressured water condition, the potential decreases from 1.23 V to 1.09 V. See, D. D. Macdonald, M. Urquidi-Macdonald, Corrosion 46P. 380 (1990). Accordingly, the pH difference ΔpH necessary for making the single electrode potentials of (3) and (4) at 200° C. is 11.6. The logarithmic term in the Nernst equation is large the temperature increases. The higher the temperature, the narrower the pH difference for necessary to make the single electrode potentials of (3) and (4) equal becomes small.

When the pH difference is wider than the above mentioned range, the potential at the cathode reaction (3) is higher than that at the anode reaction (4). As a result, the Gibbs free energy change becomes negative according to the equation (5) thereby to establish the spontaneous reaction condition in the right hand direction. The solid acid points become cathode reaction points and the solid base points become anode reaction points so that a group of micro cells is formed to bring about spontaneous water decomposition reaction. As mentioned earlier, the pH difference at 25° C. is 20.5 or more, and water decomposition at 25° C. is very difficult. However, since at 200° C., the pH difference is less than 11.6, water decomposition becomes easier.

The present invention makes it possible to catalytically decompose water at a temperature as low as several hundreds degrees Celsius.

The present invention will be explained by reference to preferred embodiments, but the scope of the present invention will not limited to these embodiments.

Embodiment 1

Figure 2:
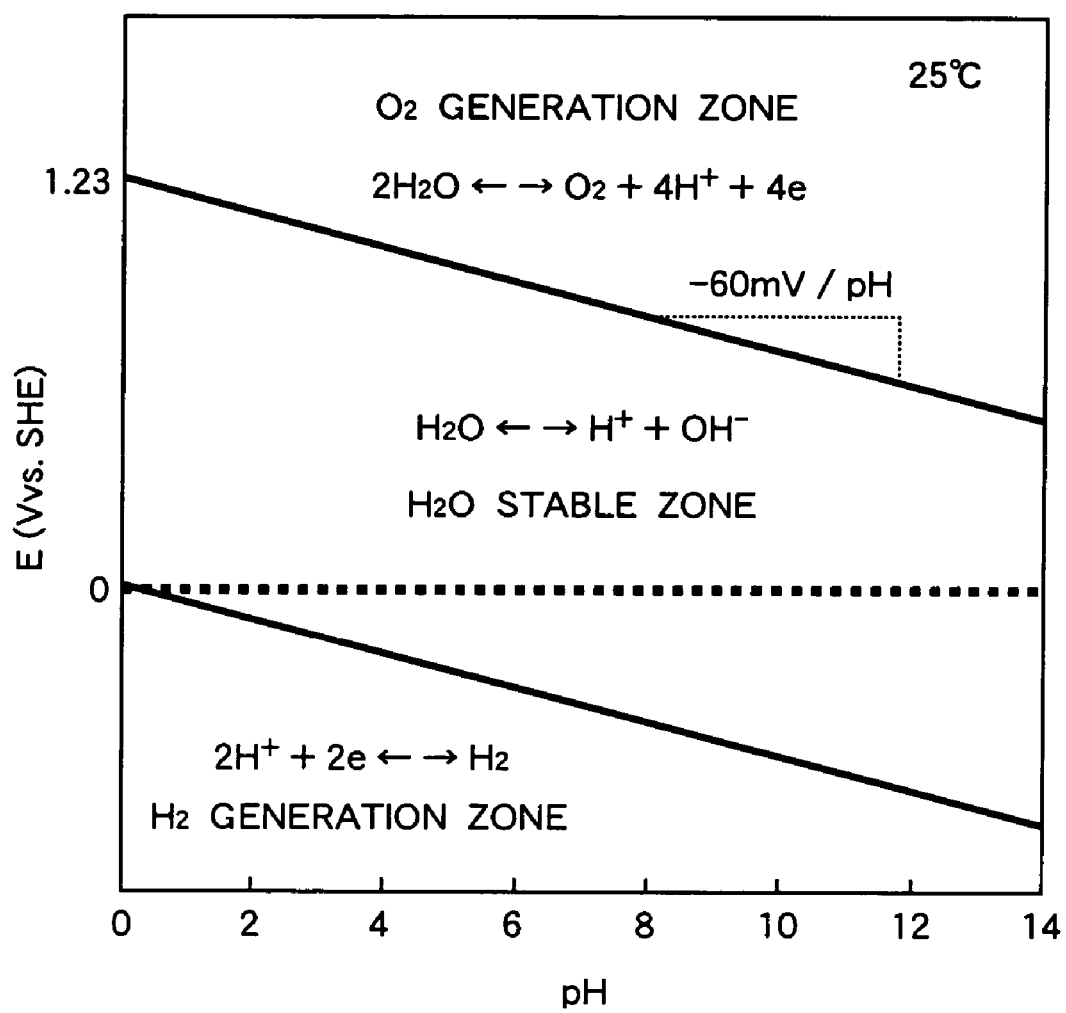
FIG. 2 is a graph showing relationship between water potential and pH at 25° C.

FIG. 1 is so-called the Pourbaix diagram showing a potential—pH diagram of water at 200° C. FIG. 2 is a potential—pH diagram of water at 25° C. The abscissas in FIGS. 1 and 2 show pH values and ordinate shows standard hydrogen potential.

In the potential—pH diagrams, the zone between the oxygen generation zone and the hydrogen generation zone shows an area where water exists stably. $\Delta E$ is obtained by subtracting the single electrode potential of the equation (4) from the single electrode potential of the equation (3).

In the diagrams, the cathode reaction is hydrogen generation reaction of (3) and the anode reaction is oxygen generation reaction of (4). The hydrogen generation reaction and the oxygen generation reaction accompany the water dissociation reaction of water shown by the equation (2), where protons accept electrons to form hydrogen and hydroxyl ions release electrons and protons to form oxygen. The overall reaction is expressed by the equation (1).

In FIG. 1, the potential difference between the hydrogen generation and oxygen generation is 1.09V, and the dependency of hydrogen generation potential on pH is −04 mV/pH.

In evaluating $\Delta G$ in the equation (1) based on FIG. 1 by using the equation (5), since the potential for hydrogen generation reaction is lower than that for oxygen generation, $\Delta E$, which is the single electrode potential difference, is minus. That is, $\Delta G$ in the equation (5) becomes plus. Accordingly, there is no case where the $\Delta G$ is negative unless the hydrogen generation line comes above the oxygen generation line.

In FIG. 2, which is the diagram at 25° C., there are two points.

(1) The potential difference between the hydrogen generation and oxygen generation is 1.23 V.
(2) The dependency of the hydrogen generation potential on pH is −60 mV/pH.

At 25° C. the decomposition potential of water increase 1.23 V from 1.09 V at 200° C. (Corrosion 46P. 380 (1990)). Further, the potential change with respect to the pH change becomes smaller than that obtained from the potential-pH diagram at 200° C. Thus, a larger pH difference for attaining $\Delta G<0$ is needed at 25° C. than that at 200° C.

The single electrode potential difference for hydrogen and oxygen reflects the temperature dependency of the standard electrode potential (Corrosion 46P. 380 (1990)). The temperature dependency on the pH dependency of the potential is caused by the temperature change of RT/nF constant in the Nernst equation.

As shown by the hatched areas in FIG. 1, there are a hydrogen generation potential area above the dotted line and an oxygen generation potential area below the dotted line. However, there is no areas for the hydrogen generation and oxygen generation at the $\Delta pH$ value of 14 level in FIG. 2.

A pH difference $\Delta pH$ for reversing the potentials of the hydrogen generation and the oxygen generation is 11.6 in FIG. 1 (1.09/0.094=11.6). In other words, if surfaces of catalysts satisfying $\Delta pH>11.6$ come close to each other, the potential of hydrogen generation reaction, which is the cathode reaction is located in the left hand area with plus symbol in FIG. 1 and the potential of the oxygen generation reaction, which is the anode reaction is located in the right hand area with minus symbol in FIG. 1. As a result, $\Delta G$ can take the negative value.

Accordingly, if the two kinds of catalysts form the condition of $\Delta pH>11.6$ at the acid point and the base point (Overview of Chemistry, edited by Chemical Society of Japan, No. 34, Catalyst Design, pp 80-82 (1982), published by Gakkai Shuppan Center), micro cells or micro batteries are formed so that spontaneous decomposition of water proceeds. That is, the condition for forming the micro cells is $\Delta pH>11.6$. Since $\Delta pH=11.6$, $\Delta G=0$. If $\Delta pH>11.6$ is satisfied, $\Delta G$ becomes negative so that the reaction in (1) from the left hand to right hand proceeds.

At 100° C., a condition for $\Delta G<0$ is $\Delta pH>15.8°$ C. Similarly, at 150° C., $\Delta pH>13.5$, at 250° C., $\Delta pH>10.2$ and at 300° C., $\Delta pH>8.96$. Catalysts that have an acid point and a base point and satisfy the above conditions are necessary for the water decomposition.

Figure 3:
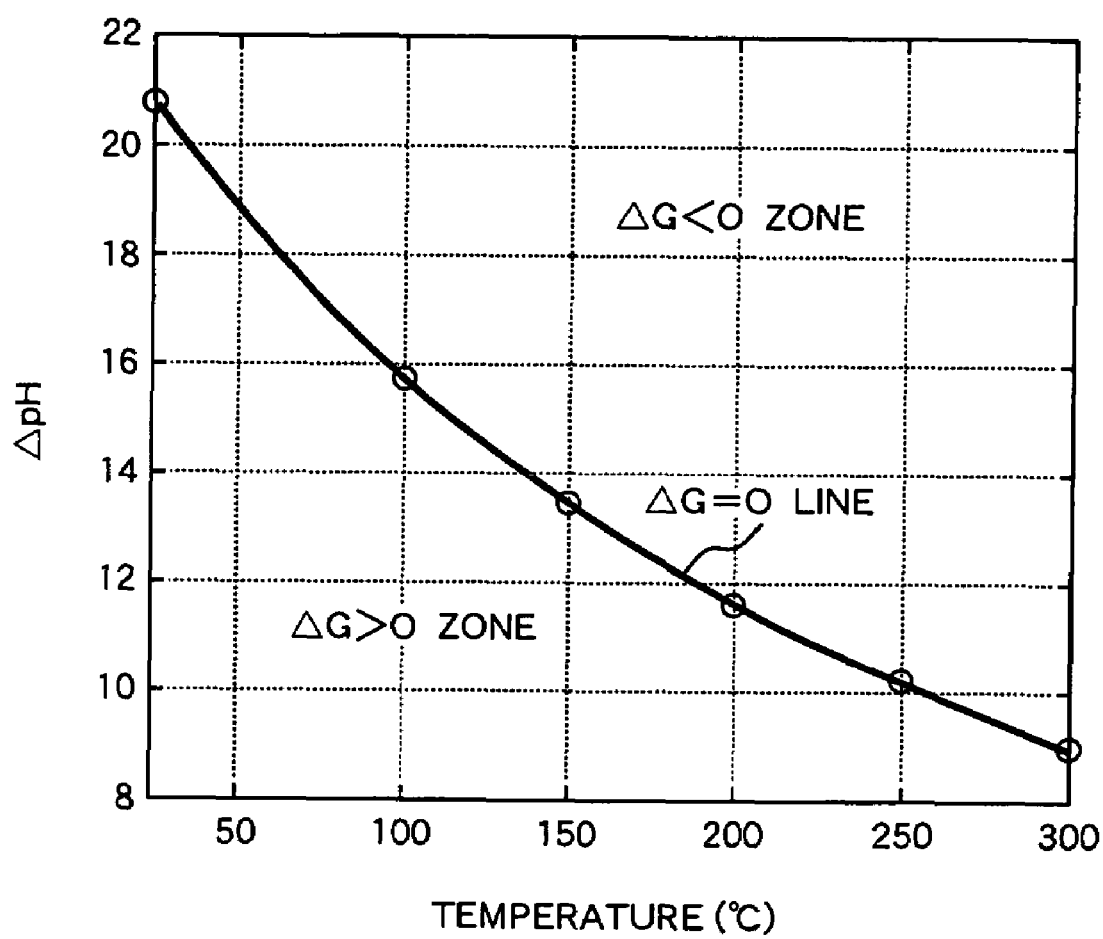
FIG. 3 is a graph showing relationship between temperature of water and pH difference at a borderline where the $\Delta G$ reverses from positive to negative or in opposite direction.

FIG. 3 shows relationship between water decomposition temperature and $\Delta pH$. As is apparent from FIG. 3, when the temperature of water is low, the pH difference between the solid acid catalyst and the solid base catalyst should be large to establish the relationship of $\Delta G<0$. In FIG. 3, the solid line is $\Delta G=0$; the $\Delta pH$ zone above the line is $\Delta G<0$ and the $\Delta pH$ zone below the line is $\Delta G>0$.

An example of a combination of the solid acid catalyst and solid base catalyst that meets the $\Delta G<0$ condition is as follows.

The solid acid catalyst; $Al_2O_3.SiO_2$ containing 70% by weight of $SiO_2$.

The solid base catalyst: at least one of alkali metal compounds and alkaline earth metal compounds such as $CaO$, $MgO$, $K_2O$, etc.

Ceramic wool is an example of $Al_2O_3.SiO_2$ composition. The ceramic wool comprises fibers of several microns in diameter. The solid acid catalyst material works as acid points and the solid base catalyst material works as base points. That is, the acid points function as a cathode and the base points function as an anode if the temperature of water is 200° C. or higher and $\Delta G<0$ is satisfied.

FIG. 4 shows an imaginary structure of distribution of micro-cells formed in the mixture of the solid acid catalyst and the solid base catalyst. The micro-cells are formed at the contact points of the catalysts. Water adsorbed in the micro-cells are decomposed spontaneously to produce hydrogen and oxygen.

Figure 5:
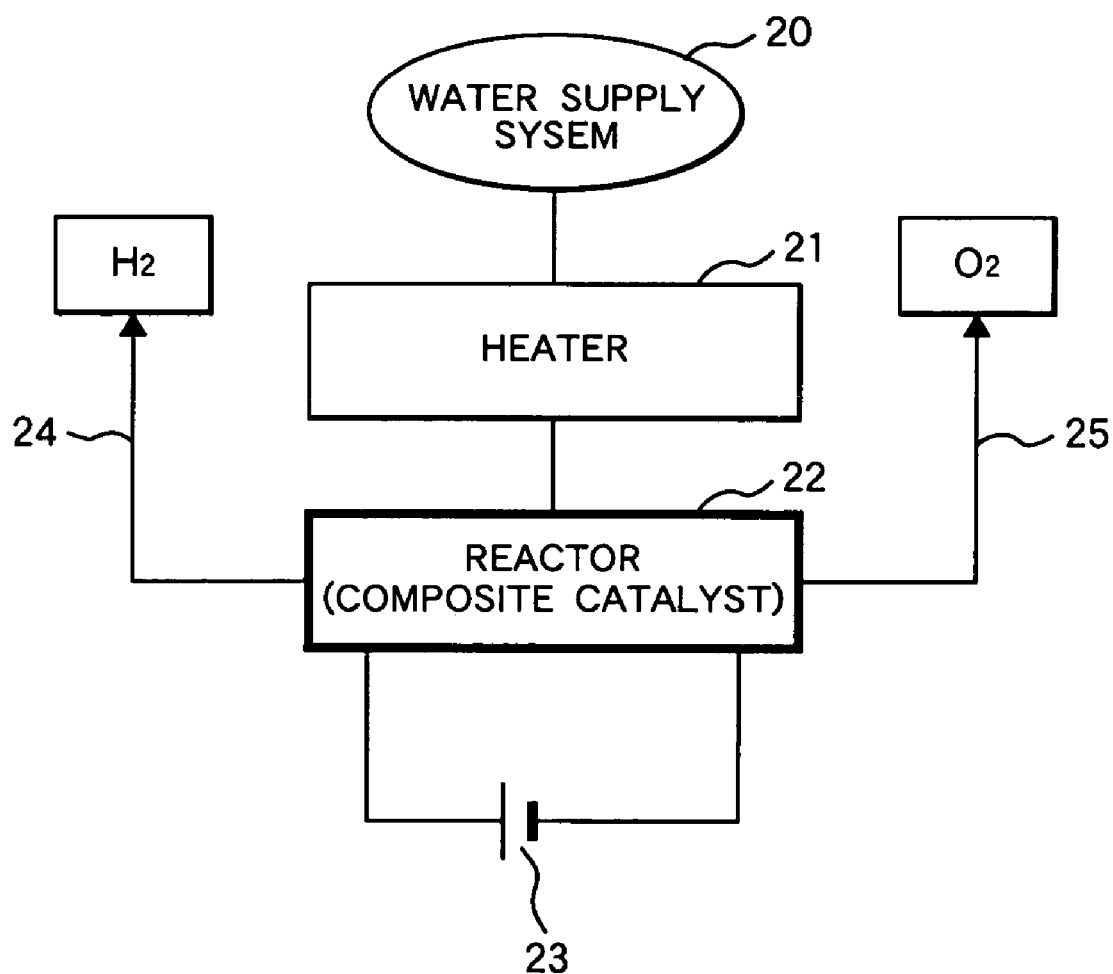
FIG. 5 is a flow chart of a water decomposition method using the micro-cells.

FIG. 5 is a diagram of a water decomposition system of the present invention, which comprises a water supply system 20, a heating section 21, a reactor 22 containing micro-cells of the composite catalyst, a hydrogen conduit 24 and an oxygen conduit 25. The reactor section is provided with a cathode and an anode to which a low voltage is applied by a power source 23 to separately produce hydrogen and oxygen. The heating section utilizes heat from chemical plants, atomic power stations, thermal power plants, etc.

In this embodiment, $Al_2O_3.SiO_2$ containing 80% by weight of $SiO_2$ as the solid acid catalyst and $MgO$ or $K_2O$ as the solid base catalyst were used as a mixture of 1:1. The average particle size of the catalysts was 10 to 30 μm. The catalysts may be used not only in the form of particles, but in the form of pellets, grains, honeycombs, fibers, membranes, rods, etc. The water is supplied to the reactor from the bottom towards the top of the reactor. The reactor is heated to 200° C. or higher.

According to this embodiment, hydrogen and oxygen are produced at several hundreds Celsius without using electric energy.

Embodiment 2

Figure 6:
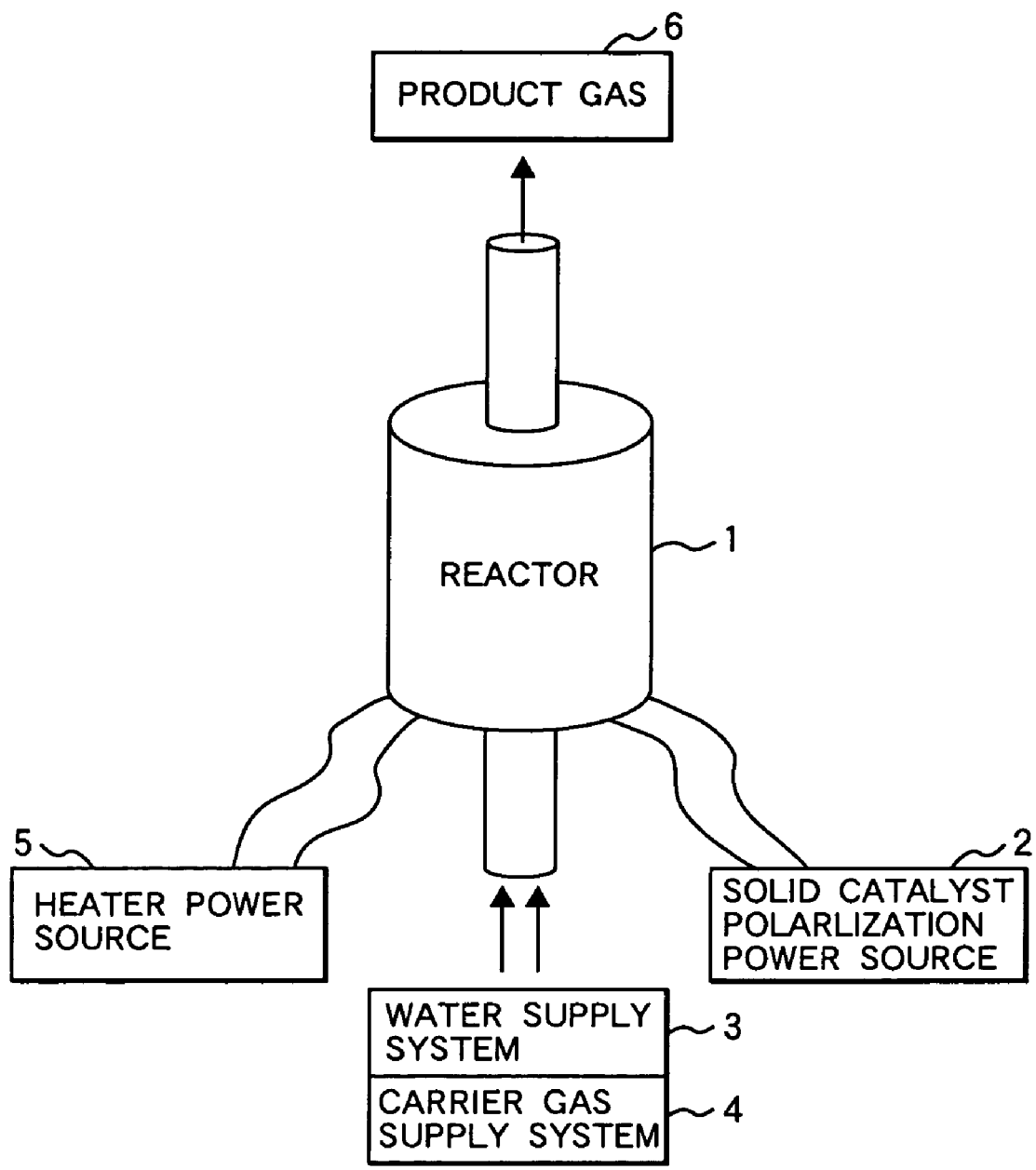
FIG. 6 is a diagrammatic view of a water decomposition apparatus of the present invention.

FIG. 6 is a diagram of a hydrogen production system comprising a catalytic decomposition reactor and a control systems. A mixture of steam and argon gas is supplied to the bottom of the reactor 1 from the water supply source 3. The carrier gas (Ar) is supplied to the steam from the carrier gas supply source 4.

The reactor is equipped with a heater connected to the electric heater power source 5. The reactor has a pressure vessel to withstand a high pressure. The adsorbed water in the catalysts is maintained in such a state that hydrogen is effectively produced by the micro-cells. The reactor is equipped with a pair of electrode for polarizing the micro-cells in the catalysts. As a result, the micro-cells decompose water to produce hydrogen and oxygen separately. The power source applies a potential between the electrodes of a voltage such as 1.0 volt, which is sufficient to polarize the micro-cells. Produced hydrogen and oxygen are discharged from the upper part of the reactor.

Figure 7:
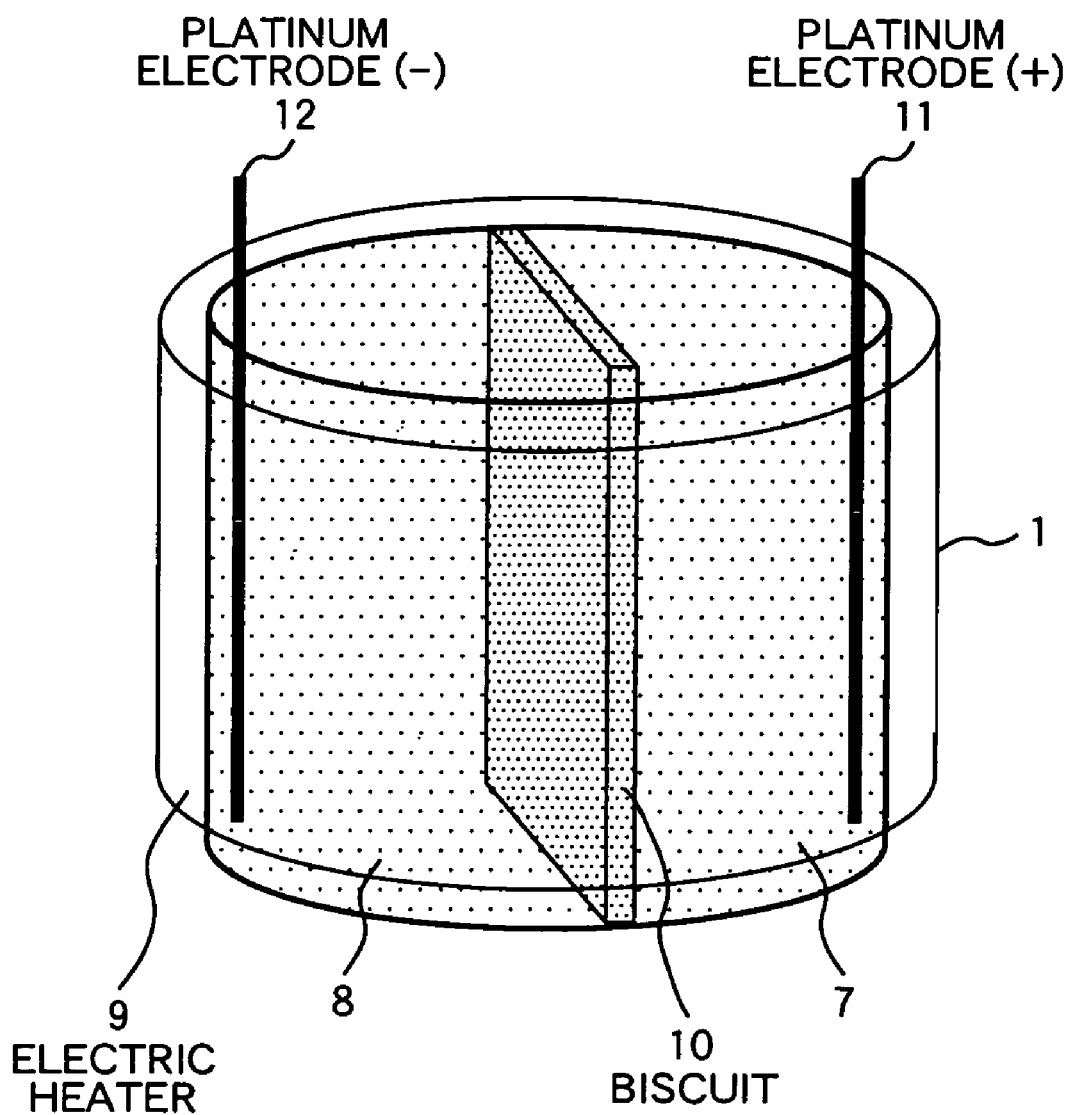
FIG. 7 is a perspective view of a micro-cell for explanation of the present invention.

FIG. 7 shows a perspective view of the reactor used in the system shown in FIG. 6. The reactor 1 contains two segments each made of a composition catalyst comprising the solid acid catalyst and the solid base catalyst, which are separated with a ion-permeable ceramic membrane 10 made of 99.9% pure alumina biscuit and having a thickness of about 0.5 mm. The height of the charged catalyst particles was ⅔ the depth of the reactor vessel 1. The catalyst particles were mixed with quartz glass beads of a grain size of 0.5 mm in a weight ratio of 1:1. The one of the segments 7 was contacted with platinum electrode 11 (+) and the other segment 8 was contacted with platinum electrode 12 (−). The diameter of the electrodes was 2 mm. The electrodes were connected with the power source 2.

When the electric heater 98 is controlled to 130° C., water supplied at a rate of 2 mL/min goes up from the bottom thereof, while boiling. Part of the water comes from the top of the reactor. The platinum electrodes are connected with an electrometer having a resistivity of $10^{12}$ Ω or more to measure the potential. When the potential between the electrodes was measured, the one segment 7 exhibited a 0.05 volt higher potential than the other. Therefore, the Gibbs free energy ΔG for water decomposition given by the equation (5) is negative. That is, as is understood from FIG. 1, the pH value at the solid acid catalyst 7 increased and the pH value at the solid base catalyst lowered so that the potential difference of 0.05 volt was created.

However, under the above conditions, generation of hydrogen was not confirmed. It is because that a potential necessary for decomposition of water was not created by the electric conductive resistance through the biscuit plate 10 shown in FIG. 7 and by activation energy.

Then, the electrometer used in the embodiment shown in FIG. 7 was changed to polarizing electrodes, which are used in electro-chemical analysis and have a low resistance, and the potential between the platinum electrodes was controlled to 0.5 volt. As a result, a current of 0.1 mA/cm$^2$ flew between the electrodes. The analysis of the steam gas showed that hydrogen and oxygen were produced at a molar ratio of 1:2. An amount of hydrogen produced was 0.2 cc/hour in conversion at 0 Celsius. An amount of hydrogen produced was 0.04 cc/hour based on a quantity of electricity in accordance with the Faraday's law of electrolysis. The difference between the total amount of hydrogen and the amount of hydrogen by electrolysis (0.2-0.04 cc/hour) is an amount produced by the action of the micro-cells.

The heating of the reaction vessel can be done by not only the electric heater, but also by heat from atomic power plants, chemical plants, thermal power plants, etc.

What is claimed is:

1. A method of catalytically decomposing water, which comprises contacting water with a composite catalyst comprising a solid acid catalyst and a solid base catalyst at an elevated temperature, wherein the composite catalyst contains the solid acid catalyst in an amount of 36 to 65% by weight and the balance being the solid base catalyst, and wherein the temperature is higher than a temperature at which pH values of the ($H_2O/O_2$ redox) potential and ($H_2O/H_2$ redox) potential are equal to each other, the redox potentials being given by a potential—pH value diagram.

2. The method of catalytically decomposing water according to claim 1, wherein the composite catalyst is divided into plural segments by means of one or at least one ion permeable membrane.

3. The method of catalytically decomposing water according to claim 1, wherein the temperature at which the decomposition of water is conducted is higher than 130° C.

4. The method of catalytically decomposing water according to claim 1, wherein the pH values of the solid acid catalyst and the pH value of the solid base catalyst are different at the temperature at which the decomposition of water is conducted.

5. The method of catalytically decomposing water according to claim 1, wherein the catalysts are selected from the grour consisting of particles, grains, pellets, honeycombs, plates, rods, fibers and membranes.

6. The method of catalytically decomposing water according to claim 5, wherein the catalysts are particles having a size of 1 to 50 μm in diameter.

7. The method of catalytically decomposing water according to claim 1, wherein the solid acid catalyst contains silicate as a main component and the solid base catalyst contains at least one material selected from the group consisting of alkali metal compounds and alkaline earth metal compounds.

8. The method of catalytically decomposing water according to claim 7, wherein the solid acid catalyst contains alumino-silicate as a main component and the solid base catalyst contains at least one oxide selected from the group consisting of oxides of K, Mg and Ca.

* * * * *